Figure 1:
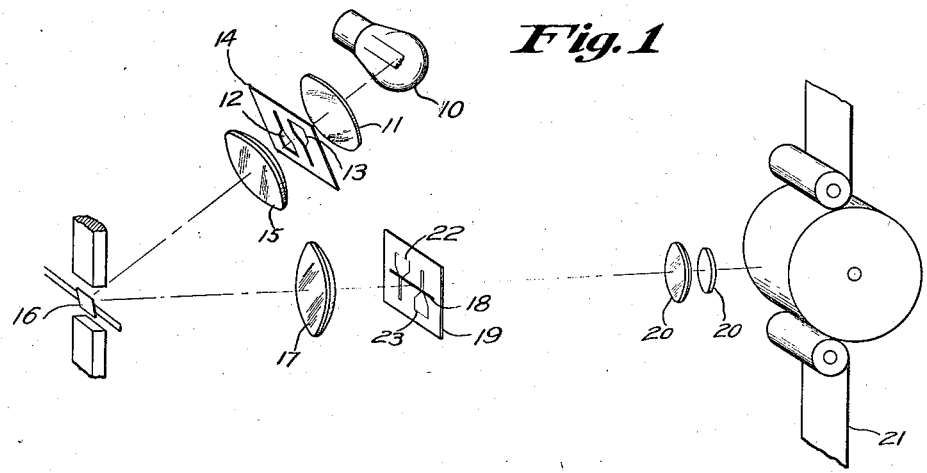

Nov. 2, 1937.  G. L. DIMMICK  2,097,657

PHOTOGRAPHIC RECORDING OF SOUND

Filed July 23, 1935

INVENTOR
GLENN L. DIMMICK

BY
ATTORNEY

Patented Nov. 2, 1937

2,097,657

UNITED STATES PATENT OFFICE 2,097,657

PHOTOGRAPHIC RECORDING OF SOUND

Glenn L. Dimmick, Audubon, N. J., assignor to Radio Corporation of America, a corporation of Delaware Application July 23, 1935, Serial No. 32,734

8 Claims. (Cl. 179—100.3)

This invention relates to the photographic recording of sound and has for its principal object the provision of an improved apparatus and method of operation for preventing the distortion otherwise produced by overmodulation of the recorded sound, by slight misalinement of the record with respect to the reproducer or by the fogging of a relatively small unexposed record area largely surrounded by an exposed record area.

In the operation of photographic sound recorders of the push-pull or similar types, it is customary to utilize one or more triangularly-shaped light beams which are vibrated transversely of a light slit in accordance with the sound or audio current to be recorded. The use of a strictly triangularly-shaped beam is not altogether satisfactory for the reason that (1) the relatively small unexposed positive record areas produced by the apex of the beam are fogged and the record is poorly delineated at these points, (2) objectionable distortion is produced when the base of the beam crosses the light slit, and (3) the component tracks of a push-pull record merge at their adjacent edges if the size of the triangularly-shaped beam is extended beyond a predetermined point.

In accordance with the present invention, these difficulties are avoided by so shaping the light beam that the fogging effect is neutralized and that overshooting does not produce any abrupt change in light slit illumination and by so spacing the push-pull recording beams that the component tracks of the record can not merge or overlap.

The invention will be better understood from the following description when considered in connection with the accompanying drawing and its scope will be pointed out in the appended claims.

Figure 2:
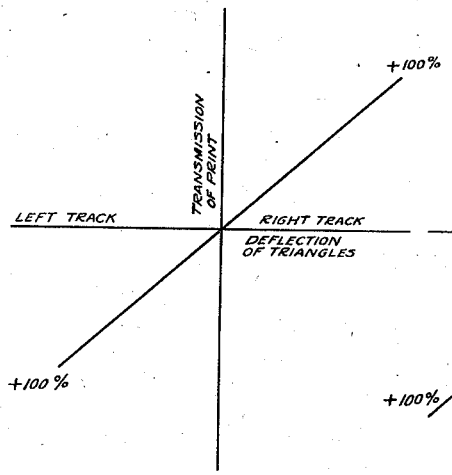
Figure 3:
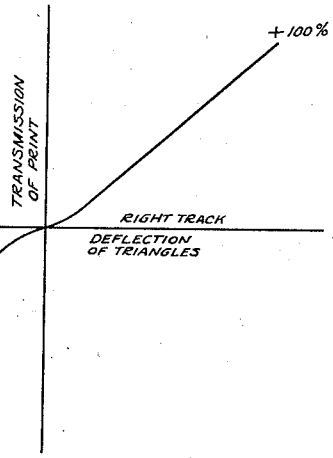
Figure 4:
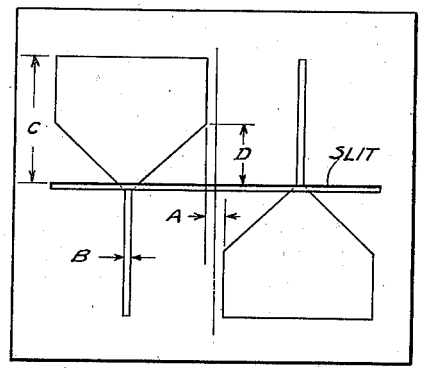

Referring to the drawing,

Fig. 1 illustrates a push-pull type recorder wherein the invention has been embodied, Fig. 2 is a characteristic curve illustrating an ideal condition of operation substantially realized by the invention, Fig. 3 is a characteristic curve illustrating the distortion produced by fogging at the edge of a photographic image, and Fig. 4 is an enlarged view of a detail of the recorder of Fig. 1.

The recorder of Fig. 1 includes a lamp 10 from which light passes through the lens 11 and the apertures 12 and 13 of a mask 14 and a lens 15 to the vibratable mirror 16 of a recording galvanometer. Light reflected from the mirror 16 passes through a lens 17 and the light slit 18 to a screen 19 and lenses 20 to the recording surface of a record strip 21. On the screen 19 the images of the apertures 12 and 13 are indicated at 22 and 23.

Because of the spreading which occurs at the edge of a photographic image, especially in the case where a relatively small unexposed area is largely surrounded by an exposed area, the relation between the deflection of the mirror 16 and the light transmission is not linear at the narrower parts of the sound track. Thus when the two edges of the dense portions of the print approach one another more closely than about a mil, the transparent area between them begins to fill in with exposed grains thus causing the transmission to be less than it should be. This produces a relation like that illustrated by the curve of Fig. 3. This relation of course must be linear if undistorted sound is to be obtained. As indicated more particularly in Fig. 4, distortion due to fogging is avoided by extending the apex of the beam in the form of a rectangle which is relatively narrow and is of such length that the slit is always illuminated, distortion due to passage of the base of the beam across the slit is avoided by extending it in the form of a triangle which prevents abrupt change in the slit illumination and mixing of the component tracks is avoided by slightly spacing the beams from one another. Thus the length of the recording beam is increased from .070 inch to .076 inch and the spacing A between the two beams is increased to .006 inch. It is apparent that when the light beams are deflected a distance D 100 percent modulation is obtained. With the improved arrangement, the deflection can be increased to a distance C before the illumination becomes zero.

The width B of the beam extensions or tails is made such that the spreading or fogging which occurs at the edge of the exposed area is just offset or neutralized. For ordinary practice this width should be about 0.0005 inch. The result of increasing the width B beyond this point is increased ground noise and decreased maximum modulation.

In practice the mask 14 containing the two triangular apertures is punched from sheet metal. In order to make a mask from which the original recording would be noiseless without printing the light beam should correspond to the unapertured part of the screen 19. For this condition the recording slit should be increased to about .001 inch.

The invention herein disclosed is described and illustrated in a copending application of Edward W. Kellogg, Serial No. 40,557, filed Sept. 4, 1935.

I claim:

1. In an apparatus for producing a photographic sound record having relatively small exposed areas, the combination of means forming a light slit, means for producing at said slit a light image triangularly-shaped and extended at its vertex to ensure continuous illumination of said slit, and means for vibrating said image transversely of said slit in accordance with the sound to be recorded.

2. In an apparatus for producing a photographic sound record of the push-pull type, the combination of means forming a light slit, means for producing at said slit a plurality of images triangularly-shaped and extended at their vertices to ensure continuous illumination of said slit at different points, and means for vibrating said images transversely of said slit in accordance with the sound to be recorded.

3. In an apparatus for producing a photographic sound record having relatively small unexposed areas, the combination of means forming a light slit, means for producing at said slit a plurality of light images triangularly-shaped and extended at their vertices in the form of rectangles of a length substantially equal to the triangular portion of said images, and means for vibrating said images in accordance with the sound to be recorded.

4. In an apparatus for producing a photographic sound record having relatively small unexposed areas, the combination of means forming a light slit, means for producing at said slit a plurality of light images triangularly-shaped and extended at their vertices to prevent fogging of said areas, said images being spaced from one another to preclude overlapping of the component sound tracks of the record.

5. In an apparatus for producing a photographic sound record having relatively small unexposed areas, the combination of means forming a light slit, means for producing at said slit a plurality of light images which are triangularly-shaped, are extended at their vertices to prevent fogging of said areas, are extended at their bases to prevent distortion at overmodulation, and are spaced apart to prevent merging of the component sound tracks, and means for vibrating said images transversely of said slit in accordance with the sound to be recorded.

6. In an apparatus for producing a photographic sound record, the combination of means forming a light slit, means for producing at said slit a plurality of light images triangularly-shaped and extended at their vertices in the form of rectangles of the length substantially equal to the triangular portion of said images, and means for vibrating said images in accordance with the sound to be recorded.

7. In an apparatus for producing a photographic sound record, the combination of means forming a light slit-means for producing at said slit a plurality of light images triangularly-shaped and extended at their vertices to prevent fogging of said areas, said images being spaced from one another to preclude overlapping of the component sound tracks of the record.

8. In an apparatus for producing a photographic sound record, the combination of means forming a light slit, means for producing at said slit a plurality of light images which are triangularly-shaped, are extended at their vertices to prevent fogging of said areas, are extended at their bases to prevent distortion at overmodulation, and are spaced apart to prevent merging of the component sound tracks, and means for vibrating said images transversely of said slit in accordance with the sound to be recorded.

GLENN L. DIMMICK.